United States Patent
Hartnett et al.

(10) Patent No.: US 10,550,831 B2
(45) Date of Patent: Feb. 4, 2020

(54) CRYOGENIC PUMP OPERATION FOR CONTROLLING HEAT EXCHANGER DISCHARGE TEMPERATURE

(71) Applicant: WESTPORT POWER INC., Vancouver (CA)

(72) Inventors: Gavin G. Hartnett, Vancouver (CA); Brendan Jason Elder, Delta (CA)

(73) Assignee: WESTPORT POWER INC., Vancouver (CA)

( * ) Notice: Subject to any disclaimer, the term of this patent is extended or adjusted under 35 U.S.C. 154(b) by 168 days.

(21) Appl. No.: 15/552,049

(22) PCT Filed: Feb. 19, 2016

(86) PCT No.: PCT/CA2016/050159
§ 371 (c)(1),
(2) Date: Aug. 18, 2017

(87) PCT Pub. No.: WO2016/131147
PCT Pub. Date: Aug. 25, 2016

(65) Prior Publication Data
US 2018/0073494 A1    Mar. 15, 2018

(30) Foreign Application Priority Data
Feb. 19, 2015 (CA) ..................... 2882584

(51) Int. Cl.
*F04B 37/08* (2006.01)
*F02M 21/06* (2006.01)
(Continued)

(52) U.S. Cl.
CPC ............... *F04B 37/08* (2013.01); *F01P 9/02* (2013.01); *F02M 21/0212* (2013.01); *F02M 21/06* (2013.01)

(58) Field of Classification Search
CPC ................. F17C 7/04; F17C 225/0123; F17C 2250/0631; F17C 2227/0142
See application file for complete search history.

(56) References Cited

U.S. PATENT DOCUMENTS 5,411,374 A * 5/1995 Gram ................... F04B 15/06
141/18
6,640,556 B2 * 11/2003 Ursan ................... F04B 15/08
62/50.6

(Continued)

FOREIGN PATENT DOCUMENTS

CA    2 809 495 A1    5/2013
CA    2 831 759 A1    1/2014

(Continued)

OTHER PUBLICATIONS

Extended European Search Report, dated Apr. 19, 2018, for European Application No. 16751865.3-1004, 9 pages.

(Continued)

*Primary Examiner* — Cassey D Bauer
(74) *Attorney, Agent, or Firm* — Seed IP Law Group LLP

(57) ABSTRACT

Gaseous fuel downstream of a heat exchanger can be too cold for fuel system components when the temperature of engine coolant employed as a working fluid in the heat exchanger is too low to elevate gaseous fuel temperature, and it is possible for the engine coolant to freeze. A method of operating a cryogenic pump for controlling discharge temperature of a heat exchanger that vaporizes a process fluid received from the cryogenic pump with heat from a working fluid, where the cryogenic pump includes a piston reciprocatable in a cylinder between a proximate cylinder head and a distal cylinder head, includes monitoring at least one of process fluid temperature and working fluid temperature; retracting the piston during an intake stroke from the proximate cylinder head to the distal cylinder head; and (Continued)

extending the piston in a plurality of incremental discharge strokes until the piston travels from the distal cylinder head back to the proximate cylinder head. At least one of the number of incremental discharge strokes, a length of incremental discharge strokes and a rest period between incremental discharge strokes is selected such that at least one of the process fluid temperature and working fluid temperature is maintained above a predetermined level.

20 Claims, 7 Drawing Sheets

(51) Int. Cl.
*F02M 21/02* (2006.01)
*F01P 9/02* (2006.01)

(56) References Cited

U.S. PATENT DOCUMENTS

| | | | | |
|---|---|---|---|---|
| 2012/0317995 | A1* | 12/2012 | Brunnhofer | F02M 21/0221 62/45.1 |
| 2014/0290280 | A1* | 10/2014 | Lee | F17C 13/002 62/50.6 |
| 2014/0352330 | A1* | 12/2014 | Baek | F17C 9/02 62/48.1 |
| 2015/0122371 | A1* | 5/2015 | Calvin | F17C 13/025 141/4 |
| 2016/0025042 | A1* | 1/2016 | Batenburg | F02M 21/02 123/3 |
| 2018/0106275 | A1* | 4/2018 | Yang | F15B 1/021 |

FOREIGN PATENT DOCUMENTS

| | | |
|---|---|---|
| CN | 201354782 Y | 12/2009 |
| WO | 2008/107378 A1 | 9/2008 |
| WO | 2014/047645 A1 | 3/2014 |

OTHER PUBLICATIONS

International Search Report and Written Opinion of the International Searching Authority, dated Mar. 16, 2016, for International Application No. PCT/CA2016/050159, 8 pages.

\* cited by examiner

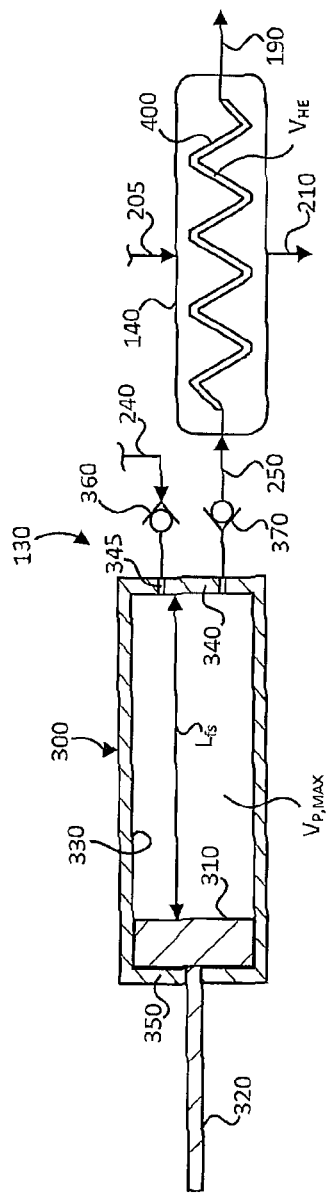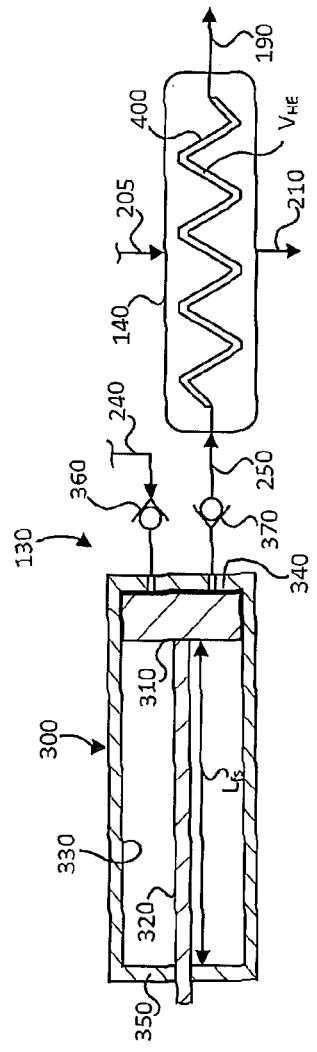

CRYOGENIC PUMP OPERATION FOR CONTROLLING HEAT EXCHANGER DISCHARGE TEMPERATURE

FIELD OF THE INVENTION

The present application relates to a technique of operating a cryogenic pump for controlling the discharge temperature of a fluid from a heat exchanger.

BACKGROUND OF THE INVENTION

Gaseous fuels can be stored at cryogenic temperatures when employed as fuel for internal combustion engines. A gaseous fuel is defined as any fuel that is in a gas state at standard temperature and pressure which is defined herein as 1 atmosphere and between 20 and 25 degrees Celsius. The gaseous fuel is stored near its boiling point in a storage vessel. For example, for methane at a storage pressure of about 1 atmosphere it can be stored in liquefied form at a temperature of about −161 degrees Celsius. Natural gas is a mixture of gasses with methane typically comprising the largest fraction, storage temperature can vary, but is normally close to that of methane. From the storage vessel the liquefied gas is pumped in a liquid state towards and through a heat exchanger where the temperature of the gaseous fuel is increased. Depending upon gaseous fuel pressure at the inlet of the heat exchanger, the gaseous fuel is normally in either the liquid state or supercritical state as it enters the heat exchanger, and either the supercritical state or gas state as it leaves. It is also possible that the gaseous fuel can be in the two phase state when the temperature and pressure are at or near the critical point. There are advantages to storing the gaseous fuel in a liquefied state. The density increases when the gaseous fuel is in the liquid state compared to either the supercritical state or the gas state requiring a smaller volume to store an equivalent amount of fuel on an energy basis. Since liquids are relatively incompressible compared to gases, it is more efficient to pressurize a gaseous fuel when in the liquid state compared to the gas state. After vaporization in the heat exchanger a fuel injection system receives vaporized gaseous fuel and introduces it, either directly or indirectly, to one or more combustion chambers in the engine. As used herein, vaporizing refers to at least increasing the enthalpy (that is, temperature) of the gaseous fuel as it pass through the heat exchanger, and depending upon the pressure and the temperature of the gaseous fuel it can also refer to changing the state of the gaseous fuel to the gas state. While natural gas (LNG) is an exemplary gaseous fuel, which is employed in many high horse power (marine, mining, locomotive) and heavy duty engine applications, other gaseous fuels are equally applicable to the technique described herein.

A heat source is required in the heat exchanger to increase the temperature of the gaseous fuel above its boiling point. Engine coolant from the water jacket of the internal combustion engine can be employed as the heat source. The engine coolant is routed through a separate path in the heat exchanger such that waste heat from combustion is transferred to the liquefied gaseous fuel from the storage vessel causing it to vaporize. By employing waste heat from the combustion process efficiency is improved compared to employing energy derived from the engine output, for example such as electrical energy from a generator driven by the engine.

It is important to control the temperature of the gaseous fuel discharged from the heat exchanger for a number of reasons. First, the gaseous fuel discharged from the heat exchanger is normally required to be in a particular state, for example the supercritical state. Second, the temperature must be above a predetermined minimum value such that components downstream from the heat exchanger are protected from excessively cold temperatures that may cause component failure. When the temperature of gaseous fuel downstream of the heat exchanger drops below the predetermined minimum value, or if it is predicted to drop below the predetermined minimum value, then the pump transferring gaseous fuel from the storage vessel to the heat exchanger must be suspended (stopped). Delivery of gaseous fuel to the fuel injection system stops when the pump stops and available fuel injection pressure decreases below the requisite level as the engine continues to consume fuel. As available fuel injection pressure decreases the engine can be designed to continue operation with a derated power output and then eventually stop, or go to a back-up secondary fuel. This situation is not desirable.

It is possible for the temperature of gaseous fuel discharged from the heat exchanger to decrease below the predetermined minimum value when the engine coolant is too cold, or when the residence time of the gaseous fuel inside the heat exchanger is too short, or due to a combination of these two reasons. During normal engine operating conditions engine coolant temperature is maintained between a predetermined range. However, engine coolant temperature can deviate from this range for a variety of reasons. One such reason is cold start of the engine when engine coolant temperature is equivalent or near to ambient temperature, which is much lower than engine coolant temperature during normal engine operating conditions. Excessively cold ambient temperatures may also cause engine coolant temperature to drop below the predetermined temperature range, or at least worsen cold start performance.

The volume of gaseous fuel inside the heat exchanger can be less than the maximum displacement volume of the pump, although this is not a requirement. For example, in high pressure direct injection applications where diesel is employed as a pilot fuel, the volume of gaseous fuel inside the heat exchanger is normally less than the maximum displacement volume of the pump since the engine can be fuelled with diesel on start-up and as the engine coolant warms up the engine can switch over to the gaseous fuel. In low-pressure spark-ignited applications, where the gaseous fuel is port or manifold injected, the volume of gaseous fuel inside the heat exchanger is normally greater than the maximum displacement volume of the pump since the engine is fuelled with gaseous fuel immediately on start-up and more residence time is needed for the gaseous fuel inside the heat exchanger to increase the enthalpy of the gaseous fuel when the engine coolant temperature is below normal engine operating conditions. Under normal engine operating conditions the temperature differential between engine coolant and the liquefied gaseous fuel inside the heat exchanger is sufficient to completely vaporize the gaseous fuel discharged from the heat exchanger. However, when the engine coolant is too cold the residence time of the gaseous fuel inside the heat exchanger is insufficient to effect its vaporization. Depending upon engine operating conditions, there is a need to increase the residence time of the gaseous fuel inside the heat exchanger to increase its temperature above a predetermined value, whether the volume inside the heat exchanger is greater than or less than the maximum displacement volume of the pump.

One technique to increase residence time of the gaseous fuel inside the heat exchanger is to decrease pump speed.

However, there is a corresponding decrease in the flow rate of gaseous fuel when pump speed is decreased, which can cause fuel pressure downstream of the heat exchanger to drop or cause unwanted fuel pressure fluctuations. Normally, the engine is not running at full load and the pump does not need to be stroking continuously without suspension. It is possible under these conditions to decrease pump speed to increase residence time of the gaseous fuel in the heat exchanger. However, in systems where the pump is directly driven from the engine it is not possible to change pump speed apart from a change in engine speed.

Canadian Patent No. 2,809,495 co-owned by the Applicant and issued Jun. 3, 2014 to Batenburg et al., hereinafter Batenburg, discloses a technique of controlling the temperature of a fluid discharged from a heat exchanger. A cryogenic pump is operated in a plurality of modes. In a first mode, the cryogenic pump discharges a first amount of fluid from the heat exchanger in every pump cycle. The temperature that correlates to the fluid downstream from the heat exchanger is monitored, and when the temperature drops below a predetermined level the cryogenic pump is operated in a second mode where a second amount of fluid is discharged from the cryogenic pump for every pump cycle, where the second amount is less than the first amount. The residence time of the cryogenic fluid in the heat exchanger increases in the second mode, by pumping a smaller amount of fluid in every pump cycle, such that more heat is transferred to the fluid thereby increasing the discharge temperature. For each pump cycle, cryogenic liquid is drawn into a pumping chamber through an inlet check valve as a piston retracts during a suction stroke, and is then pumped through an outlet check valve by the piston as it extends during a compression stroke. In the second mode, no matter the quantity of cryogenic fluid that is discharged from the pump and vaporizer, the piston in the pump completes one suction stroke and one compression stroke, and the inlet and outlet check valves are open and closed respectively during the suction stroke and closed and open respectively during the compression stroke. As the inlet check valve opens cryogenic liquid fills the volume between the piston and cylinder head of the pump when the pump begins the intake stroke, and there is a corresponding pressure decrease in the cryogenic liquid in the pump. As the cryogenic liquid comes into contact with the interior walls of the pump and the piston it absorbs heat. Due to the pressure decrease and heat absorption, a portion of the cryogenic flashes each time the inlet check valve is opened, which reduces the volumetric efficiency of the pump. It is desirable to minimize the number of pumping cycles required to pump a predetermined mass of LNG to reduce the amount of LNG that flashes within the pump to increase the volumetric efficiency of the cryogenic pump.

There is a need for an improved technique of operating a cryogenic pump when controlling the discharge temperature of a vaporizer. The present method and apparatus provide a technique for improving operation of an internal combustion engine fuelled with a liquefied gaseous fuel.

SUMMARY OF THE INVENTION

An improved method of operating a cryogenic pump for controlling discharge temperature of a heat exchanger that vaporizes a process fluid received from the cryogenic pump with heat from a working fluid, where the cryogenic pump includes a piston reciprocatable in a cylinder between a proximate cylinder head and a distal cylinder head, includes monitoring at least one of process fluid temperature and working fluid temperature; retracting the piston during an intake stroke from the proximate cylinder head to the distal cylinder head; and extending the piston in a plurality of incremental discharge strokes until the piston travels from the distal cylinder head back to the proximate cylinder head. At least one of the number of incremental discharge strokes, a length of incremental discharge strokes and a rest period between incremental discharge strokes is selected such that at least one of the process fluid temperature and working fluid temperature is maintained above a predetermined level.

The process fluid is a cryogenic fluid, and in an exemplary embodiment the process fluid is a gaseous fuel and the working fluid is engine coolant of an internal combustion engine. The gaseous fuel can be at least one of biogas, butane, ethane, hydrogen, landfill gas, methane, natural gas, propane and mixtures of these fuels.

The process fluid temperature can be one of vaporized cryogenic fluid temperature downstream of the heat exchanger; and a high-side temperature of a heat exchange region inside the heat exchanger. The working fluid temperature can be one of heat exchange fluid temperature upstream of the heat exchanger; and heat exchange fluid temperature downstream of the heat exchanger.

Stroke lengths for two or more of the incremental discharge strokes can be equal within a predetermined range of tolerance. Stroke length for each incremental discharge stroke can be determined as a function of at least one of the process fluid temperature and the working fluid temperature. The piston can be at rest between at least two respective incremental discharge strokes, and at least two rest periods between respective incremental discharge strokes are equal within a predetermined range of tolerance. Each rest period time interval between respective incremental discharge strokes can be determined as a function of at least one of the process fluid temperature and the working fluid temperature. Alternatively, or additionally, piston velocity between at least two respective incremental discharge strokes can be greater than zero and less than piston velocity during incremental discharge strokes.

An improved fuel supply system for supplying gaseous fuel to an internal combustion engine comprises a cryogenic pumping apparatus for pumping the gaseous fuel from a supply of gaseous fuel in a liquid state and a heat exchanger receiving and vaporizing the gaseous fuel from the cryogenic pumping apparatus and supplying the gaseous fuel to the internal combustion engine. The cryogenic pumping apparatus has a piston reciprocating between a proximate cylinder head near a fuel inlet and a distal cylinder head away from the fuel inlet. There is a controller operatively connected with the cryogenic pumping apparatus and programmed to command the cryogenic pumping apparatus in a pumping cycle to retract the piston during an intake stroke from the proximate cylinder head to the distal cylinder head and extend the piston in a plurality of incremental discharge strokes until the piston travels from the distal cylinder head back to the proximate cylinder head whereby at least one of the number of incremental discharge strokes, a length of incremental discharge strokes and a rest period between incremental discharge strokes is selected such that gaseous fuel temperature downstream from the heat exchanger is maintained above a first predetermined level. An effective heat exchange volume of the heat exchanger can be reduced compared to when the controller is programmed to perform complete discharge strokes.

In an exemplary embodiment, the heat exchanger employs engine coolant from the internal combustion engine as a heat source for vaporization. A temperature sensor, operatively connected with the controller, emits temperature signals representative of engine coolant temperature. The controller is further programmed to determine a representative temperature as a function of the temperature signals and to command the pumping apparatus to maintain the representative temperature above a second predetermined level. The temperature sensor can be arranged to measure engine coolant temperature downstream of the heat exchanger.

In another exemplary embodiment, the fuel supply system further comprises a temperature sensor emitting temperature signals representative of one of (1) gaseous fuel temperature downstream of the heat exchanger; (2) a high-side temperature of a heat exchange region inside the heat exchanger. The controller is operatively connected with the temperature sensor and is further programmed to determine a representative temperature as a function of said temperature signals. And by the controller commanding the pumping cycle the representative temperature is maintained above a predetermined level.

The controller can be further programmed to command the piston move an equal distance within a predetermined range of tolerance for two or more of the incremental discharge strokes. The controller can be still further programmed to determine the stroke length for each incremental discharge stroke as a function of the representative temperature. In an exemplary embodiment, the controller is programmed to command the piston to stop between at least two respective incremental discharge strokes, and to determine each rest period time interval between respective incremental discharge strokes as a function of the representative temperature. Alternatively, or additionally, the controller can be further programmed to command a piston velocity between at least two incremental discharge strokes that is greater than zero and less than the piston velocity during incremental discharge strokes.

BRIEF DESCRIPTION OF THE DRAWINGS

FIG. 2 is simplified view of a cryogenic pump according to one embodiment and a heat/exchanger for the gaseous fuel supply system of FIG. 1 showing a piston in the pump in a retracted position after an intake stroke.

FIG. 3 is a simplified view of the cryogenic pump and the heat exchanger of FIG. 2 showing the piston in a fully extended position after a full compression stroke.

FIG. 4*a* illustrates the piston at the beginning of an intake stroke. FIG. 4*b* illustrates the piston at the beginning of a discharge stroke. FIGS. 4*c*, 4*d*, 4*e* and 4*f* illustrate the piston at the end of first, second, third and fourth incremental discharge strokes. At the end of the fourth discharge stroke illustrated in FIG. 4*f* the piston is at the same position as in FIG. 4*a* at the beginning of the intake stroke.

DETAILED DESCRIPTION OF PREFERRED EMBODIMENT(S)

Figure 1:
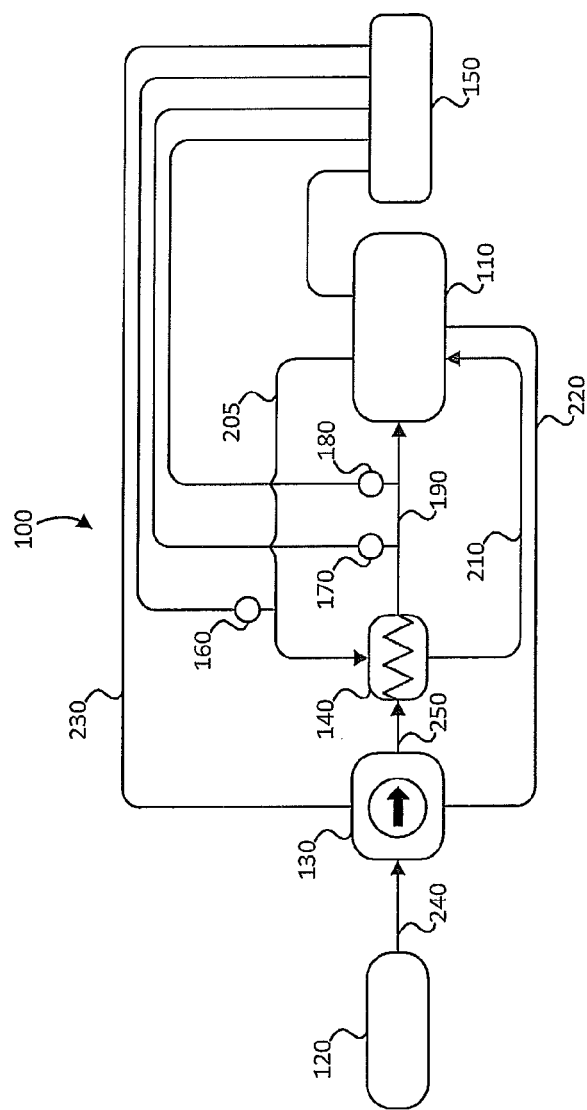
FIG. 1 is a schematic view of a gaseous fuel supply system for an internal combustion engine according to a first embodiment.

Referring to FIG. 1, there is shown a simplified gaseous fuel supply system 100 delivering gaseous fuel to internal combustion engine 110. Gaseous fuel is stored as a liquid at cryogenic temperatures in storage vessel 120, and is referred to herein interchangeably as a cryogenic fluid. Pumping apparatus 130 pumps liquefied gaseous fuel from vessel 120 through piping 240 towards heat exchanger 140 through piping 250 where the fuel undergoes a transition from the liquid to either the gas state or the supercritical state. In other embodiments, pumping apparatus 130 and heat exchanger 140 can be located inside storage vessel 120. In the present embodiment the pressure and temperature of the gaseous fuel downstream of heat exchanger 140 are such that the gaseous fuel is in the gas state, but in other embodiments the pressure and temperature of the gaseous fuel are such that the gaseous fuel is in the supercritical state. Heat exchangers are also known as vaporizers, as would be known to those familiar with the technology. Additionally, as a consequence of delivering more liquefied gas into piping 250, apparatus 130 pressurizes vaporized gaseous fuel downstream from heat exchanger 140 in piping 190. A fuel injection system (not shown) fluidly communicates with piping 190 and introduces (directly or indirectly) vaporized gaseous fuel to one or more combustion chambers in internal combustion engine 110. Piping 205 and 210 are part of an engine coolant circuit and are in fluid communication with a water jacket (not shown) in engine 110 allowing circulation of engine coolant from the water jacket through heat exchanger 140 where waste heat from combustion is employed to vaporize the liquefied gaseous fuel. With regard to heat exchanger 140, the engine coolant is a working fluid and the gaseous fuel from pumping apparatus 130 is a process fluid. The working fluid does work on the process fluid to change its state. As used herein, engine coolant temperature is equivalent to working fluid temperature, and gaseous fuel temperature is equivalent to process fluid temperature.

Electronic controller 150 communicates with engine 110 to receive status signals from sensors employed in internal combustion engines and to control actuators such as those found in fuel injectors. Temperature sensor 160 sends signals representative of the temperature of engine coolant in piping 205 to controller 150. Alternatively, or additionally, a temperature sensor (not shown) can be employed to send signals to the controller representative of the temperature of engine coolant in piping 210. Temperature sensor 170 sends signals representative of the temperature of vaporized gaseous fuel in piping 190, and pressure sensor 180 sends signals representative of the pressure of vaporized gaseous fuel in piping 190 to controller 150.

Pumping apparatus 130 comprises a positive displacement pump that allows for a variable displacement of gaseous fuel during compression strokes of the pump. Positive displacement pumps of the types that are mechanically, hydraulically and electrically actuated can be employed. Command and status signals are transmitted over control line 230 such that controller 150 commands pumping apparatus 130 to pump. Alternatively, or additionally, mechanical drive 220 from engine 110, such as a power take off and the like, is employed to actuate apparatus 130 to pump liquefied gaseous fuel.

Referring now to FIG. 2 there is shown a partial view of pumping apparatus 130 including reciprocating-piston pump 300 shown in simplified form as would be known by those familiar with the technology. Piston rod 320 is connected with piston 310 and is driven by known mechanically, hydraulically or electrically actuated mechanisms to reciprocate the piston within cylinder 330 between cylinder heads 340 and 350. Proximate cylinder head 340 is near fuel inlet 345 for cylinder 330, and in this embodiment comprises the fuel inlet, and distal cylinder head 350 comprises an opening for piston rod 320. Inlet check valve 360 allows liquefied gaseous fuel to enter cylinder 330 from storage vessel 120 during an intake stroke of pump 300 when piston 310 moves away from cylinder head 340. Although not illustrated in FIG. 2, inlet check valve 360 can be located in fuel inlet 345 in other embodiments. Outlet check valve 370 allows gaseous fuel to exit cylinder 330 during a discharge stroke of pump 300 when piston 310 moves towards cylinder head 340. Intake strokes of pump 300 are also known as suction strokes or retraction strokes, and discharge strokes are also known as compression strokes or extension strokes, as would be known by those familiar with the technology. Inlet check valve 360 is closed during the discharge stroke and outlet check valve 370 is closed during the intake stroke. Although outlet check valve 370 is in fluid communication with a conduit through cylinder head 340, the conduit is not required to pass through the cylinder head and in other embodiments the conduit can pass through a wall of cylinder 330 near the cylinder head. Pump 300 has a maximum displacement volume of $V_{D,MAX}$, which is the volume between piston 310 and cylinder head 340 when the piston is fully retracted to cylinder head 350 after the intake stroke, as illustrated in FIG. 2. The length piston 310 travels during a complete intake stroke is $L_{fs}$. During a complete discharge stroke pump 300 discharges a volume of gaseous fuel equal to displacement volume $V_{D,MAX}$ by fully extending piston 310 to cylinder head 340, as is shown in FIG. 3. The length piston 310 travels during a complete discharge stroke is also $L_{fs}$.

Heat exchanger 140 comprises heat exchange conduit 400 through which gaseous fuel passes from pump 300 towards engine 110. Conduit 400 represents the effective heat exchange region where heat is transferred between engine coolant, passing through the heat exchanger from supply piping 205 to return piping 210, and gaseous fuel. The volume of gaseous fuel within conduit 400 is defined as $V_{HE}$, and is also referred to as the effective heat exchange volume in this specification. During normal engine operating conditions, the temperature of the gaseous fuel exiting conduit 400 is elevated above a predetermined minimum value. A temperature differential between engine coolant in piping 205 and gaseous fuel entering conduit 400 allows sufficient heat transfer to occur to vaporize the gaseous fuel discharged from heat exchanger 140 and raise its temperature above the predetermined minimum value in conduit 190. The temperature differential between engine coolant and liquefied gaseous fuel in all engine operating conditions is substantially determined by the temperature of engine coolant in piping 205 since the temperature of liquefied gaseous fuel is at or near its boiling point in vessel 120 and piping 250.

During certain engine operating conditions of engine 110, the temperature differential between engine coolant and liquefied natural gas is insufficient to elevate the temperature of vaporized gaseous fuel in conduit 190 above the predetermined minimum value. One such condition occurs during engine cold start when the temperature of engine coolant is equal or near to ambient temperature. In this situation not enough heat has been transferred from the engine coolant to the volume of gaseous fuel leaving heat exchanger 140 during the discharge stroke to elevate its temperature above the predetermined minimum value. To increase gaseous fuel temperature in conduit 190 heat transfer to the volume of gaseous fuel discharged from heat exchanger 140 for each pump stroke must be increased. Increasing the temperature differential will increase heat transfer; however, since engine coolant temperature cannot be immediately increased another technique must be employed. Increasing the effective residence time of the volume of gaseous fuel discharged from heat exchanger during each discharge stroke of pump 300 also increases heat transfer to the gaseous fuel. The heat transferred into the gaseous fuel is determined by the heat transfer rate (which is a function of the temperature differential between engine coolant temperature and liquefied gaseous fuel temperature) and the amount of time the gaseous fuel spends in the effective heat exchange region (residence time) of heat exchanger 140.

Figure 4A:
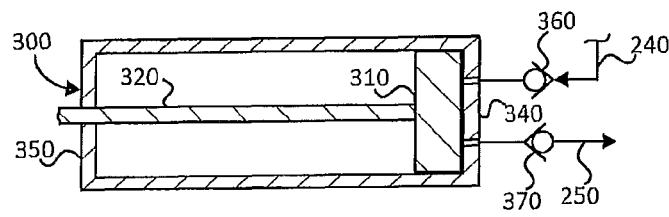
FIGS. 4*a* through 4*f* are simplified views of the cryogenic pump of FIG. 2 illustrating the piston in resting positions during a pumping cycle.
Figure 4B:
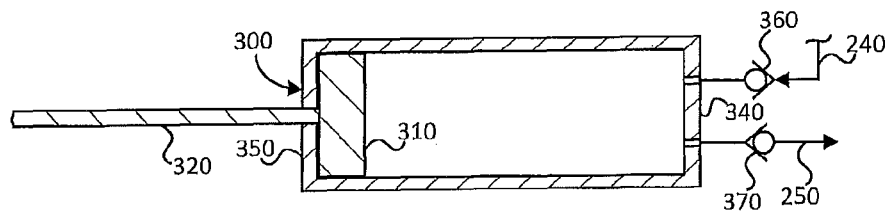
Figure 4C:
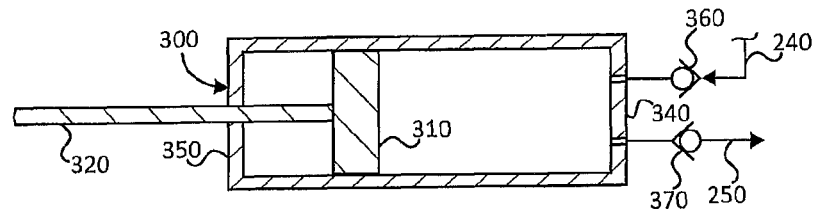
Figure 4D:
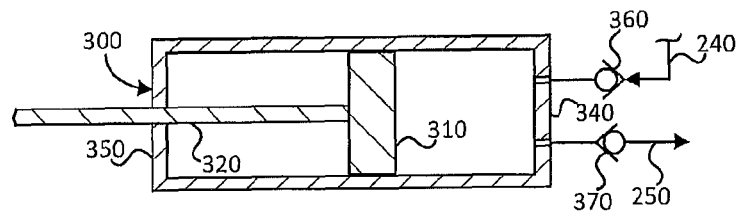
Figure 4E:
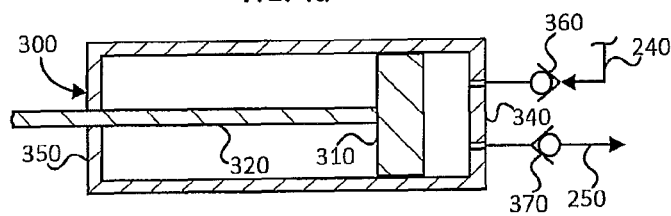
Figure 4F:
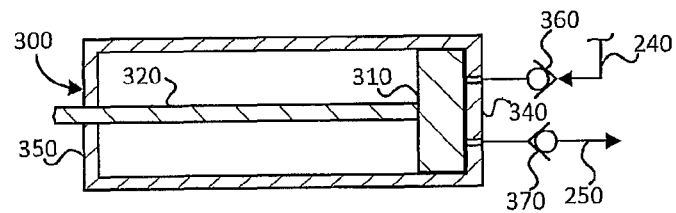

Referring to FIGS. 4a through 4f a pump cycle for pump 300 is now described that increases the effective residence time of cryogenic fluid in heat exchanger 140 by performing multiple incremental discharge strokes for each complete intake stroke of piston 310. In FIG. 4a, piston 310 is adjacent proximate cylinder head 340 and is about to begin the intake stroke during which cryogenic fluid is drawn in through inlet check valve 360 as the piston travels towards distal cylinder head 350. After completing the intake stroke piston 310 is adjacent cylinder head 350, as illustrated in FIG. 4b, where the piston is about to begin discharging cryogenic fluid through outlet check valve 370. Instead of the piston continuously travelling until it reaches cylinder head 340, the piston is advanced towards cylinder head 340 in discrete steps by repeatedly moving the piston towards cylinder head 340 in increments and stopping between the increments. FIGS. 4c through 4f illustrate piston 310 at rest after having completed first, second, third and fourth incremental discharge strokes respectively. This technique can also be called pulsed discharging referring to the pulsed nature of the pressure of a hydraulic fluid that is employed to actuate piston 310 in certain embodiments. For example, in FIG. 4c piston 310 is shown stationary after having moved from the position illustrated in FIG. 4b. After a predetermined time interval (that is, the rest period) piston 310 begins another pulsed discharge stroke and moves to the location illustrated in FIG. 4d, and again waits for the predetermined time interval until moving to the location illustrated in FIG. 4e, and so on until the piston reaches cylinder head 340. The length of each discharge stroke, and the volume of fluid discharged, can be the same for each incremental discharge stroke, or they can be different. Similarly, the amount of time piston 310 is stopped between incremental discharge strokes can be the same, or it can be different. In the illustrated embodiment of FIGS. 4a through 4f, a complete pump cycle comprises one complete intake stroke and four incremental discharge strokes. In general, there can be two or more incremental discharge strokes for each complete intake stroke. In other embodiments, instead of piston 310 coming to rest between incremental discharge strokes, it can slow down such that the velocity of the piston between incremental discharge strokes is greater than zero and less than the velocity of the piston during incremental discharge strokes.

Figure 5:
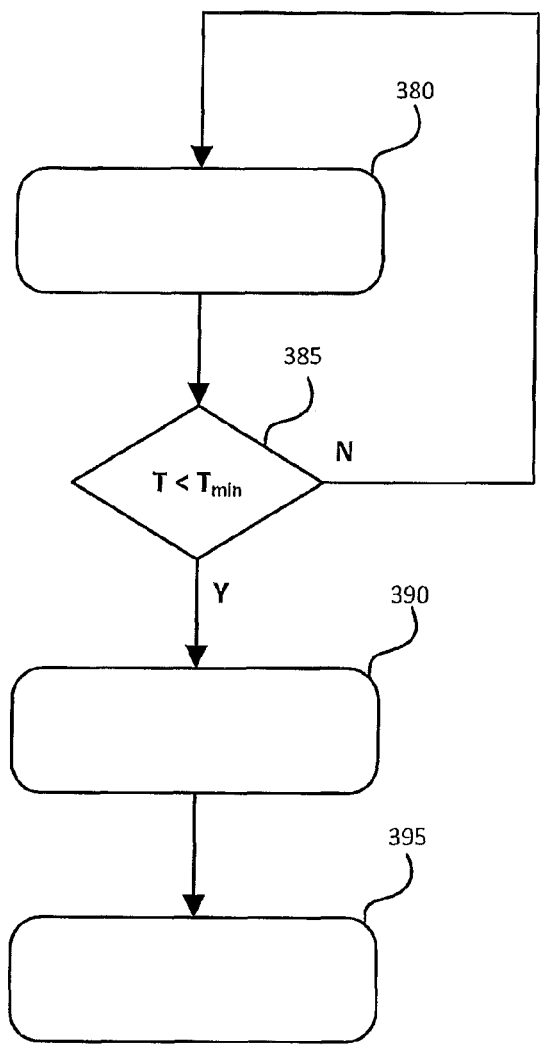
FIG. 5 is a flow chart view of a method for operating the cryogenic pump of FIG. 2.

Referring now to FIG. 5, a method of operating pumping apparatus 130 (seen in FIG. 1) is now described. In step 380 one of the process fluid temperature and the working fluid temperature is monitored to determine whether the residence time of the gaseous fuel inside the heat exchanger needs to be increased. The process fluid is the gaseous fuel, and is typically measured downstream from heat exchanger 140, and the working fluid is the heat exchange fluid of the heat exchanger, which in an exemplary embodiment is engine coolant from engine 110. The process fluid temperature or the working fluid temperature is compared with the predetermined minimum value in step 385 to determine when it is below this value, and when it is below the predetermined minimum value the technique of incremental discharge strokes is performed in steps 390 and 395. In step 390, piston 310 is retracted during an intake from proximate cylinder 340 near fuel inlet check valve 360 to distal cylinder head 350. In step 395, piston 310 is extended in a plurality of incremental discharge strokes until the piston travels from distal cylinder head 350 to proximate cylinder head 340. Steps 390 and 395 can be performed repeatedly until the process fluid temperature and the working fluid temperature is above the predetermined minimum value.

By employing a plurality of incremental discharge strokes for pump 300 the residence time of cryogenic fluid in heat exchanger 140 is increased allowing more heat to transfer to the cryogenic fluid increasing the average temperature of the fluid both in the heat exchanger and downstream thereof. The likelihood of engine coolant freezing is reduced since the average temperature of the cryogenic fluid in the heat exchanger has increased. The size of heat exchanger 140 can be reduced, especially in low pressure applications where the effective heat exchange volume $V_{HE}$ is conventionally several times the size of displacement volume $V_{D,MAX}$ of cryogenic pump 300 to allow engine 110 to cold start fuelling with gaseous fuel immediately. Previously, heat exchange volume $V_{HE}$ was sized such that gaseous fuel temperature downstream of heat exchanger 140 was maintained above the predetermined value while pump 300 performed a complete discharge stroke where piston 310 travelled continuously full stroke length $L_{fs}$. When incremental discharge strokes are performed, heat exchange volume $V_{HE}$ can be less than it would be if incremental discharge strokes are not performed. A smaller heat exchanger is less expensive and can be integrated into off-engine systems with greater flexibility.

The volumetric efficiency of the incremental stroke technique taught herein is improved compared to the partial stroke technique of the '495 patent hereinbefore described. The incremental stroke technique requires a fewer number of intake strokes, compared to the partial stroke technique, to pump equivalent volumes of process fluid. For example, if the partial stroke technique pumps half the maximum displacement volume $V_{D,MAX}$ of pump 300 for each partial stroke, then the partial stroke technique requires two intake and discharge strokes for each intake and complete discharge stroke of the incremental discharge stroke technique to pump approximately the same volume of process fluid. Each partial or full intake stroke requires inlet check valve 360 to open from a closed position. Each time the inlet check valve opens a small amount of cryogenic fluid flashes as it fills the volume between piston 310 and cylinder head 340. This volume comprises a dead space volume and the volume due to piston 310 moving away from the inlet check valve at the beginning of the intake stroke. The dead space volume is that volume between piston 310 and cylinder head 340 when the piston is full extended towards the cylinder head, and exists primarily due to manufacturing tolerances. The cryogenic fluid flashes due to a pressure drop across the inlet check valve and when the cryogenic fluid absorbs heat from piston 310, which heats up due to the reciprocating motion within cylinder 330. The incremental stroke technique therefore flashes a smaller amount of cryogenic liquid, compared to the partial stroke technique, since the incremental stroke technique requires less intake strokes to pump the same amount of process fluid. Flashing of cryogenic fluid in cylinder 330 reduces the effective displacement volume of pump 300 since the flashed fluid needs to be re-condensed during the discharge stroke before pressure within cylinder 330 can begin to significantly increase to open outlet check valve 370. Since the partial stroke technique flashes more cryogenic fluid compared to the incremental stroke technique when piston 310 travels a complete discharge stroke length ($L_{FS}$), then the partial stroke technique pumps less process fluid. It follows that by decreasing the amount of cryogenic fluid that flashes in pump 300 (by decreasing the number of times inlet check valve 360 opens) the fewer the number of pump cycles are required to pump a predetermined amount of fuel, thereby increasing volumetric efficiency of the pump. In the incremental stroke technique, volumetric efficiency can decrease if gaseous fuel in cylinder 330 blows-by a seal (not shown) that fluidly seals the piston with the cylinder, after piston 310 comes to a stop at the end of an incremental discharge stroke, requiring the pressure in the cylinder to be built up again on the next incremental discharge stroke. It is preferred that blow-by gas be reduced.

Other embodiments of gaseous fuel supply systems will now be described with respect to FIGS. 6, 7 and 8, on which the incremental stroke technique described herein can be performed. There can be other gaseous fuel supply systems, known to those familiar with the technology, on which the incremental stroke technique can be performed.

Figure 6:
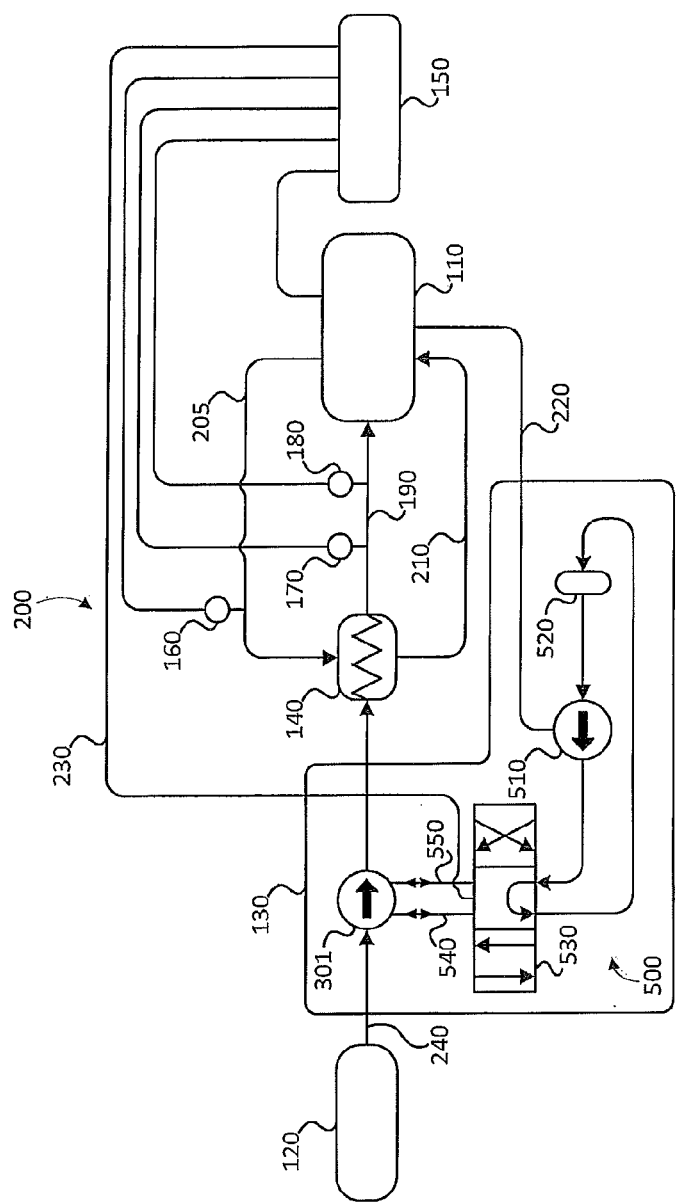
FIG. 6 is a schematic view of a gaseous fuel supply system for an internal combustion engine according to a second embodiment.

Referring now to FIG. 6, gaseous fuel supply system 200 is shown in schematic form according to a second embodiment that is similar to the embodiment of FIG. 1 and like parts have like reference numerals and may not be described in detail, if at all. Pumping apparatus 130 comprises reciprocating-piston, positive displacement pump 301 actuated by hydraulic circuit 500. Hydraulic pump 510 pumps hydraulic fluid from reservoir 520 through flow control valve 530. Hydraulic pump 510 is driven by engine 110 over mechanical linkage 220 such that its speed is directly related to the speed of engine 110. Valve 530 is actuated by controller 150 over line 230 to switch the flow direction of hydraulic fluid into and out of pump 301, and to divert flow from pump 301 altogether. The flow direction of hydraulic fluid in piping 540 and 550 with respect to pump 301 is alternated between intake and discharge strokes, as will be explained in more detail below. The flow of hydraulic fluid is diverted away from the pump back to reservoir 520 when pump 301 is suspended or stopped. The flow rate of hydraulic fluid in circuit 500 is directly related to the speed of engine 110. Similarly, the flow rate of gaseous fuel pumped by pump 301 when the pump is continuously pumping is also directly related to the speed of engine 110 since it is driven by hydraulic circuit 500. It is not possible to decrease the speed of pump 301 at any particular engine speed to increase the residence time of gaseous fuel in heat exchanger 140 unless a transmission is employed between engine 110 and hydraulic pump 510, which would increase the cost of fuel system 200 and effect gaseous fuel flow rate. Hydraulic circuit 500 can be operated to command pump 301 to perform the incremental discharge technique described with respect to FIGS. 4a through 4f.

Figure 7:
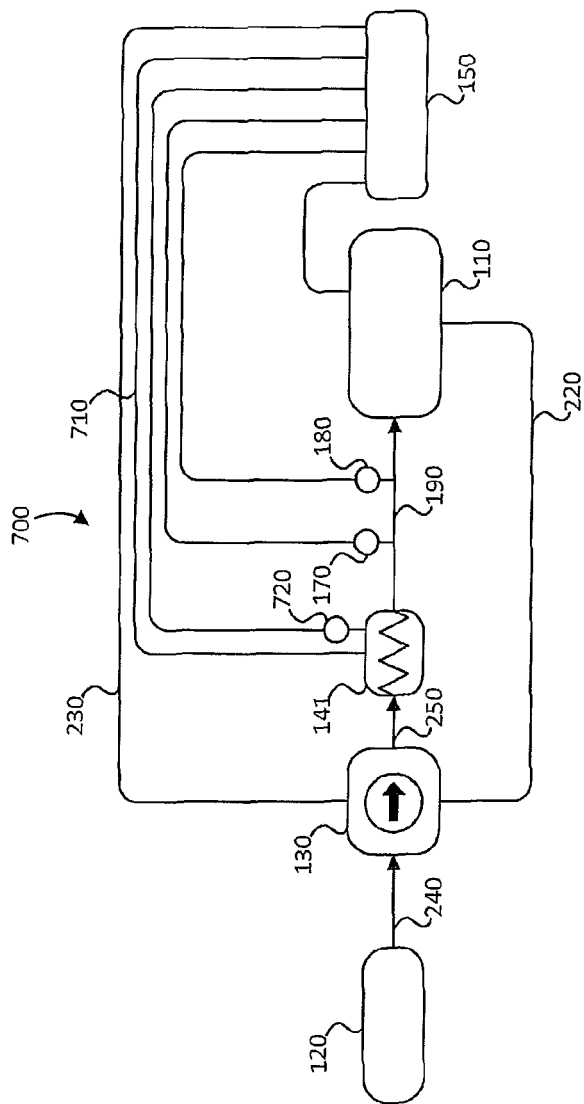
FIG. 7 is a schematic view of a gaseous fuel supply system for an internal combustion engine according to a third embodiment comprising a heat exchanger employing an electric heater as a heat source for vaporizing.

Referring now to FIG. 7, gaseous fuel supply system 700 is shown according to a third embodiment that is similar to the embodiment of FIG. 1 and like parts have like reference numerals and may not be described in detail, if at all. Heat exchanger 141 comprises an electric heater (not shown) for generating heat to vaporize liquefied gaseous fuel received from pumping apparatus 130. The amount of heat generated by the electric heater is controlled by controller 150 over line 710, and can be increased or decreased separately from changes in the speed of engine 110. Temperature sensor 720 emits signals to controller 150 representative of a temperature of a heat exchange region inside the heat exchanger, for example representative of a temperature of the electric heater. It is advantageous to perform the technique of incremental discharge stroking described previously with pumping apparatus 130 in the present embodiment, since the heat generated from the electric heater cannot be immediately increased or it may not be desired to increase energy of consumption of the electric heater. In some applications it is advantageous to combine the electric heater in heat exchanger 141 and the employment of engine coolant in heat exchanger 140 into a single heat exchanging apparatus.

Figure 8:
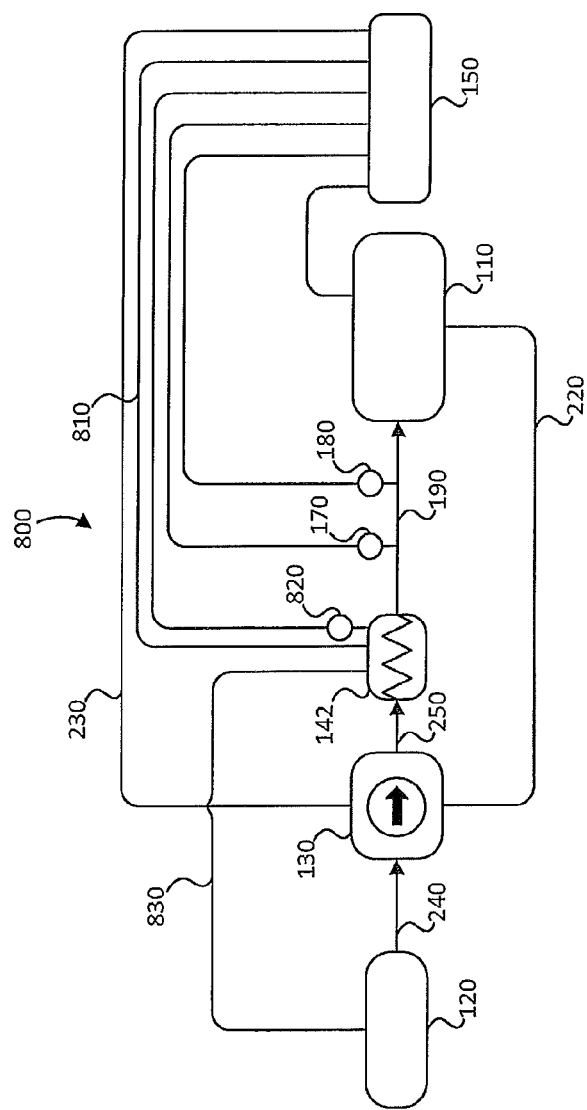
FIG. 8 is a schematic view of a gaseous fuel supply system for an internal combustion engine according to a fourth embodiment comprising a heat exchanger employing a boiler burning boil-off gas as a heat source for vaporizing.

Referring now to FIG. 8, gaseous fuel supply system 800 is shown according to a fourth embodiment that is similar to the embodiment of FIG. 1 and like parts have like reference numerals and may not be described in detail, if at all. Heat exchanger 142 comprises a boiler (not shown) that burns at least one of boil-off gas, received from storage vessel 120 over piping 830, and liquefied gaseous fuel from storage vessel 120 for generating heat to vaporize liquefied gaseous fuel. The amount of heat generated by the boiler is controlled by controller 150 over line 810, and can be increased or decreased separately from changes in the speed of engine 110. Temperature sensor 820 emits signals to controller 150 representative of a temperature of a heat exchange region inside the heat exchanger, for example representative of a temperature generated by the boiler. It is advantageous to perform the technique of incremental discharge stroking described previously with pumping apparatus 130 in the present embodiment, since the heat generated from the boiler cannot be immediately increased or it may not be desired to increase boil-off consumption of the boiler. In some applications it is advantageous to combine the boiler in heat exchanger 142 and the employment of engine coolant in heat exchanger 140 into a single heat exchanging apparatus.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of operating a cryogenic pump for controlling discharge temperature of a heat exchanger that vaporizes a process fluid received from the cryogenic pump with heat from a working fluid, the cryogenic pump comprising a piston reciprocatable in a cylinder between a proximate cylinder head and a distal cylinder head, the method comprising:
    monitoring at least one of process fluid temperature and working fluid temperature;
    retracting the piston during an intake stroke from the proximate cylinder head to the distal cylinder head; and
    extending the piston in a plurality of incremental discharge strokes until the piston travels from the distal cylinder head back to the proximate cylinder head;
    wherein at least one of the number of incremental discharge strokes, a length of incremental discharge strokes and a rest period between incremental discharge strokes is selected such that at least one of the process fluid temperature and working fluid temperature is maintained above a predetermined level.

2. The method of claim 1, wherein at least one of:
    the process fluid is a cryogenic fluid; and
        the working fluid is engine coolant of an internal combustion engine.

3. The method of claim 1, wherein the process fluid temperature is one of:
    vaporized cryogenic fluid temperature downstream of the heat exchanger; and
    a high-side temperature of a heat exchange region inside the heat exchanger.

4. The method of claim 1, wherein the working fluid temperature is one of:
    heat exchange fluid temperature upstream of the heat exchanger; and
    heat exchange fluid temperature downstream of the heat exchanger.

5. The method of claim 1, wherein one of:
    stroke length for two or more of the incremental discharge strokes are equal within a predetermined range of tolerance; and
        stroke length for each incremental discharge stroke is determined as a function of at least one of the process fluid temperature and the working fluid temperature.

6. The method of claim 1, wherein at least two rest periods between respective incremental discharge strokes are equal within a predetermined range of tolerance.

7. The method of claim 1, wherein each rest period time interval between respective incremental discharge strokes is determined as a function of at least one of the process fluid temperature and the working fluid temperature.

8. The method of claim 1, wherein piston velocity between at least two incremental discharge strokes is greater than zero and less than piston velocity during incremental discharge strokes.

9. The method of claim 1, wherein the cryogenic fluid is a gaseous fuel.

10. The method of claim 9, wherein the gaseous fuel is at least one of biogas, butane, ethane, hydrogen, landfill gas, methane, natural gas, propane and mixtures of these fuels.

11. A fuel supply system for supplying gaseous fuel to an internal combustion engine comprising:
    a cryogenic pumping apparatus for pumping the gaseous fuel from a supply of gaseous fuel in a liquid state and having a piston reciprocating between a proximate cylinder head near a fuel inlet and a distal cylinder head away from the fuel inlet;
    a heat exchanger receiving and vaporizing the gaseous fuel from the cryogenic pumping apparatus and supplying the gaseous fuel to the internal combustion engine; and
    a controller operatively connected with the cryogenic pumping apparatus and programmed to command the cryogenic pumping apparatus in a pumping cycle to retract the piston during an intake stroke from the proximate cylinder head to the distal cylinder head and extend the piston in a plurality of incremental discharge strokes until the piston travels from the distal cylinder head back to the proximate cylinder head;

wherein at least one of the number of incremental discharge strokes, a length of incremental discharge strokes and a rest period between incremental discharge strokes is selected such that gaseous fuel temperature downstream from the heat exchanger is maintained above a first predetermined level.

12. The fuel supply system of claim 11, wherein the heat exchanger employs engine coolant from the internal combustion engine as a heat source for vaporization, further comprising a temperature sensor emitting temperature signals representative of engine coolant temperature, wherein the controller is operatively connected with the temperature sensor and is further programmed to determine a representative temperature as a function of the temperature signals; wherein the representative temperature is maintained above a second predetermined level.

13. The fuel supply system of claim 12, wherein the engine coolant temperature is measured downstream of the heat exchanger.

14. The fuel supply system of claim 11 further comprising a temperature sensor emitting temperature signals representative of one of:
  gaseous fuel temperature downstream of the heat exchanger; and
  a high-side temperature of a heat exchange region inside the heat exchanger;
  wherein the controller is operatively connected with the temperature sensor and is further programmed to determine a representative temperature as a function of said temperature signals;
  wherein the representative temperature is maintained above the first predetermined level.

15. The fuel supply system of claim 11, wherein the controller is further programmed to command the piston move an equal distance within a predetermined range of tolerance for two or more of the incremental discharge strokes.

16. The fuel supply system of claim 11, wherein the controller is further programmed to determine the stroke length for each incremental discharge stroke as a function of the representative temperature.

17. The fuel supply system of claim 11, wherein the controller is further programmed to command the piston to stop between at least two respective incremental discharge strokes.

18. The fuel supply system of claim 11, wherein the controller is further programmed to command a piston velocity between at least two respective incremental discharge strokes that is greater than zero and less than the piston velocity during incremental discharge strokes.

19. The fuel supply system of claim 11, wherein the controller is further programmed to determine each rest period time interval between respective incremental discharge strokes as a function of the representative temperature.

20. The fuel supply system of claim 11, wherein an effective heat exchange volume of the heat exchanger is reduced compared to when the controller is programmed to perform complete discharge strokes.

* * * * *